United States Patent [19]

Mohri et al.

[11] 4,066,465

[45] Jan. 3, 1978

[54] ALKALI-RESISTANT GLASS COMPOSITION

[75] Inventors: Yoshio Mohri, Lono; Takashi Hiroishi, Matsusaka; Kinzi Sano, Matsusaka; Koichi Huruya, Matsusaka; Tadashi Muramoto, Matsusaka; Masato Tao, Matsusaka, all of Japan

[73] Assignee: Central Glass Company, Limited, Japan

[21] Appl. No.: 728,894

[22] Filed: Oct. 4, 1976

Related U.S. Application Data

[63] Continuation of Ser. No. 630,044, Nov. 7, 1975, abandoned.

[51] Int. Cl.$^2$ .............................. C03C 13/00
[52] U.S. Cl. ........................ 106/50; 106/52; 106/99
[58] Field of Search .................. 106/50, 52, 99

[56] References Cited

U.S. PATENT DOCUMENTS

| 3,861,926 | 1/1975 | Irlam et al. | 106/50 |
| 3,861,927 | 1/1975 | Kimura et al. | 106/50 |
| 3,901,720 | 8/1975 | Majumdar | 106/50 |

OTHER PUBLICATIONS

Volf, M. B. Technical Glasses–London (1961), pp. 120–123.

*Primary Examiner*—Helen M. McCarthy
*Attorney, Agent, or Firm*—Lowe, King, Price & Markva

[57] ABSTRACT

A glass composition particularly useful for producing alkali-resistant glass fibers, containing, by weight, from 53 to 63% $SiO_2$, from 21 to 23% $ZrO_2$ and from 10 to 21% $Na_2O$.

2 Claims, No Drawings

ALKALI-RESISTANT GLASS COMPOSITION

This is a continuation of application Ser. No. 630,044, filed Nov. 7, 1975, now abandoned.

This invention relates to a glass composition which has high alkali resistance and is particularly useful for producing glass fibers useful as a reinforcing constituent of concrete or mortar.

Glass fibers which are used as a reinforcing constituent of concrete or mortar products need to have high alkali resistance because of the strong alkaline property of cement. Unfortunately, conventional glass fibers typified by fibers of alkali-free borosilicate glass (E-glass), which is mainly composed of $SiO_2$, $Al_2O_3$, $CaO$ and $B_2O_3$, are not fully satisfactory in their alkali resistance.

It is an object of the present invention to provide a glass composition which has improved alkali resistance and relatively low viscosity at usual working temperatures in the production of glass fibers.

A glass composition according to the invention contains, by weight, from 53 to 63% $SiO_2$, from 21 to 23% $ZrO_2$ and from 10 to 21% $Na_2O$.

Minor amounts of $K_2O$ and/or $Li_2O$ may be mixed with $Na_2O$, and small amounts of usual additives such as a fluoride, an oxide of alkaline earth metal and aluminum oxide may be included.

Other features and advantages of the invention will become apparent from the following detailed description.

Glass fibers are drawn continuously by flowing molten glass through orifices formed in a bushing of, e.g., platinum or its alloy, and it is known that an optimum viscosity of the molten glass at the working temperature during drawing is about $10^3$ poise.

Accordingly, working temperature during the drawing of glass fibers must be lower than the highest operational temperature of the bushing. As is known, the highest operational temperature of the bushing of platinum or platinum alloy is about 1370° C when the bushing is required to have a sufficiently long life in an industrial production line. In development of a new glass composition, therefore, the relationship between temperature and the viscosity of the glass composition is of essential concern, and the composition must be devised to have a viscosity of about $10^3$ poise at a temperature lower than 1370° C. The above described composition according to the invention was determined taking into adequate consideration this matter in addition to improvement on alkali resistance.

In a composition according to the invention, $SiO_2$ is an essential constituent to form glass likewise in conventional glass compositions. $ZrO_2$ plays mainly the role of enhancing alkali resistance of the composition, but has an unfavorable effect on the viscosity. The alkali resistance is enhanced as the amount of $ZrO_2$ is increased, but the viscosity of the composition cannot be lowered to about $10^3$ poise even when heated to 1370° C if the amount of $ZrO_2$ exceeds 23%.

The presence of $Na_2O$, a typical alkali metal oxide, is necessary to facilitate melting of the glass composition, but the amount of $Na_2O$ is limited to a minimum requisite so that some variations in the amounts of other constituents may be possible.

According to the invention, $Na_2O$ is the most suitable alkali metal oxide, but minor amounts of $K_2O$ and/or $LiO_2$ may be used together with $Na_2O$ for the purpose of making the composition still more resistant to alkali and water and/or aiding in the melting and fining. The amounts of $K_2O$ and $Li_2O$ should be limited to 5% and 3% at the highest, respectively, and the total amount of $R_2O$ (R represents an alkali metal) should be 21% at the higher. The presence of more than 21% of $R_2O$ causes lowering of chemical resistances of the glass composition to, e.g., acids and alkalies.

In addition to the above essential constituents, fluorine may be added in the form of a fluoride such as fluorspar, cryolite, sodium fluosilicate or aluminum fluosilicate to aid in the melting and fining of the glass composition. The amount of the fluoride must be minimized to prevent erosion of a furnace or tank for the melting operation and evaporation of fluorine.

Other optional constituents of a glass composition according to the invention are an oxide of an a group II metal selected from Ca, Mg, Ba and Za and/or $Al_2O_3$. An oxide of Group II metal is used for obtaining improved workability with the composition, that is, ease of melting and lowered viscosity, but its amount should be limited to 5% at the highest by reason of its influences on alkali resistance and substantial melting temperature of the composition. $Al_2O_3$ is sometimes used for obtaining a glass composition having particular physical properties and sometimes introduced unintentionally into the composition as an impurity component of the essential materials. In any case, the $Al_2O_3$ content in the composition should be 5% at the highest.

Examples of glass composition according to the invention are presented in the following Table 1 together with results of an alkali resistance test. Table 1 includes a typical composition of conventional E-glass and results of the same test with this E-glass.

The alkali resistance test consisted of immersing 5 g of a glass composition in the form of powder, the particle size of which was about 0.11 to about 0.15 mm, in 1N-NaOH solution kept at 70° C or 86° C, and weighing the glass powder after the lapse of 90 min. The alkali resistance in Table 1 is presented as percentage of the weight loss of a glass powder caused by the immersion to the initial weight of the glass powder.

Table 1

| Example No. | | 1 | 2 | 3 | 4 | 5 | 6 | 7 | 8 | 9 | 10 | 11 | 12 | 13 | E-glass |
|---|---|---|---|---|---|---|---|---|---|---|---|---|---|---|---|
| $SiO_2$ | | 56.1 | 61.0 | 58.0 | 56.0 | 61.0 | 61.0 | 58.0 | 58.0 | 58.0 | 58.0 | 55.0 | 59.0 | 53.0 | 53.7 |
| $ZrO_2$ | | 21.0 | 21.0 | 21.0 | 21.0 | 21.0 | 21.0 | 21.0 | 21.0 | 21.0 | 21.0 | 21.0 | 23.0 | 23.0 | — |
| $Na_2O$ | | 21.0 | 16.5 | 16.3 | 11.5 | 10.5 | 16.5 | 16.5 | 16.5 | 16.5 | 16.5 | 16.5 | 12.5 | 12.5 | 0.2 |
| $Al_2O_3$ | | 1.0 | 1.5 | 1.5 | 1.5 | 1.5 | 1.5 | — | — | — | 4.5 | 4.5 | 1.3 | 4.3 | 13.6 |
| CaO | 1.0 | 1.0 | 3.0 | 5.0 | — | — | — | — | 1.0 | 3.0 | 1.0 | 3.0 | 20.2 | | |
| MgO | — | — | — | — | — | — | 3.0 | — | — | — | — | — | — | 2.2 | |
| ZnO | — | — | — | — | — | — | — | 3.0 | — | — | — | — | — | — | |
| BaO | — | — | — | — | — | — | — | — | 3.0 | — | — | — | — | — | |
| $K_2O$ | — | — | — | — | 5.0 | 5.0 | — | — | — | — | — | 3.0 | 3.0 | 0.7 | |
| $Li_2O$ | — | — | — | — | — | 1.0 | — | — | — | — | — | — | 1.0 | 1.0 | 0.1 |
| | | | | | | | | | | | | | | | $B_2O_3$ 8.2 |
| $F_2$ | | 0.5 | — | 0.5 | 1.0 | — | — | — | — | — | — | — | — | — | — |
| | | | | | | | | | | | | | | | $Fe_2O_3$ 1.9 |
| Alkali | 86° C | 0.16 | 0.28 | — | 0.23 | — | — | — | — | — | — | — | — | — | 3.11 |

Table 1-continued

| Example No. | 1 | 2 | 3 | 4 | 5 | 6 | 7 | 8 | 9 | 10 | 11 | 12 | 13 | E-glass |
|---|---|---|---|---|---|---|---|---|---|---|---|---|---|---|
| Resist. 70° C | 0.12 | 0.16 | 0.47 | — | 0.07 | 0.07 | 0.06 | 0.04 | 0.23 | 0.33 | 0.17 | 0.09 | 0.14 | 2.5 |

The following Table 1A shows the composition of Examples 1 to 13 in Table 1 when converted to mole %:

Table 1A (mol%)

| Example No. | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 62.9 | 68.4 | 65.1 | 62.2 | 70.5 | 69.7 | 65.4 | 67.1 | 67.9 | 65.9 | 63.1 | 67.0 | 61.6 |
| $ZrO_2$ | 11.5 | 11.5 | 11.5 | 11.4 | 11.9 | 11.7 | 11.6 | 11.9 | 12.0 | 11.7 | 11.8 | 12.7 | 13.1 |
| $Na_2O$ | 22.8 | 17.9 | 17.9 | 17.8 | 12.9 | 11.6 | 18.0 | 18.5 | 18.7 | 18.2 | 18.4 | 13.8 | 14.1 |
| $Al_2O_3$ | 0.7 | 1.0 | 1.0 | 1.0 | 1.0 | 1.0 | — | — | — | 3.0 | 3.0 | 0.9 | 3.0 |
| CaO | 1.2 | 1.2 | 3.6 | 6.0 | — | — | — | — | — | 1.2 | 3.7 | 1.2 | 3.7 |
| MgO | — | — | — | — | — | — | 5.0 | — | — | — | — | — | — |
| ZnO | — | — | — | — | — | — | — | 2.6 | — | — | — | — | — |
| BaO | — | — | — | — | — | — | — | — | 1.4 | — | — | — | — |
| $K_2O$ | — | — | — | — | 3.7 | 3.7 | — | , | — | , | — | 2.2 | 2.2 |
| $Li_2O$ | — | — | — | — | — | 2.3 | — | — | — | , | — | 2.3 | 2.3 |
| $F_2$ | 0.9 | — | 0.9 | 1.8 | — | — | — | — | — | — | — | — | — |

With respect to glass compositions of Example No. 1 to No. 3, the following Table 2 shows the devitrification temperature $T_L$, working temperature $T_W$ at which the viscosity of the glass composition becomes $10^3$ poise, and the temperature difference $T_W - T_L$. The temperature difference $T_W - T_L$ indicates workability of the glass composition. There is no fear of occuring crystallization or any impurity matter being formed during drawing of glass fibers when the difference is about 50° C at the smallest.

Table 2

| Example No. | 1 | 2 | 3 |
|---|---|---|---|
| Devitrification Temp. $T_L$ | 1195 – 1200° C | 1225 – 1230° C | 1240 – 1250° C |
| Working $T_W$ | 1270° C | 1363° C | 1298° C |
| $T_W - T_L$ | 75 – 80° C | 133 – 138° C | 48 – 58° C |

As seen in the above Tables, a glass composition according to the invention has extremely high alkali resistance, i.e., about 0.5% at the largest by the described test method compared with the value of 2.5% for a typical E-glass. Besides, the viscosity of a glass composition according to the invention becomes the desired value, i.e., $10^3$ poise, at a working temperature fairly lower than the critical temperature, 1370° C, and this working temperature is higher than the devitrification temperature by at least about 50° C. Accordingly, a glass composition according to the invention can be drawn into fibers by the use of conventional process and apparatus for drawing fibers of E-glass on an industrial scale and gives extremely highly alkali-resistant glass fibers.

What is claimed is:

1. An alkali-resistant glass fiber composed of a glass composition consisting of, by weight,

| | |
|---|---|
| $SiO_2$ | 53 to 63% |
| $ZrO_2$ | 21 to 23% |
| $R_2O$ | 10 to 21% |
| R'O | 0 to 5% |
| $Al_2O_3$ | 0 to 5% |
| $F_2$ | 0 to 1% | wherein $R_2O$ represents $Na_2O$ or a mixture of $Na_2O$ and at least one of up to 5% $K_2O$ and up to 3% $Li_2O$; R'O represents an oxide of Group II metal selected from the group consisting of CaO, MgO, BaO and ZnO, the total amount of the $SiO_2$, $ZrO_2$ and $R_2O$ components in said composition ranging from 92.5 weight percent to 98.5 weight percent.

2. An alkali-resistant glass fiber according to claim 1, wherein said glass composition consists of, by weight,

| | |
|---|---|
| $SiO_2$ | 56.1 to 61% |
| $ZrO_2$ | about 21% |
| $Na_2O$ | 16.5 to 21% |
| CaO | 1 to 3% |
| $Al_2O_3$ | 1 to 1.5% |
| $F_2$ | 0 to 0.5% |

* * * * *